Figure 7:
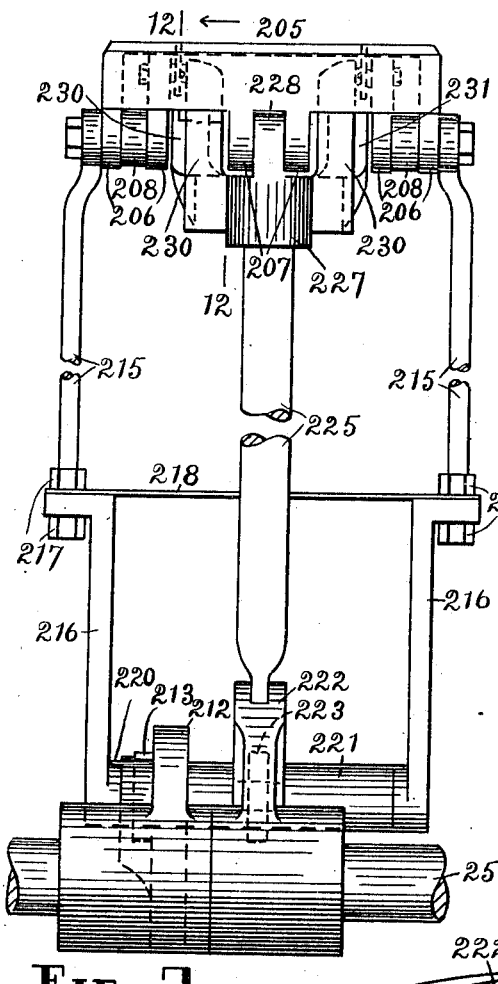

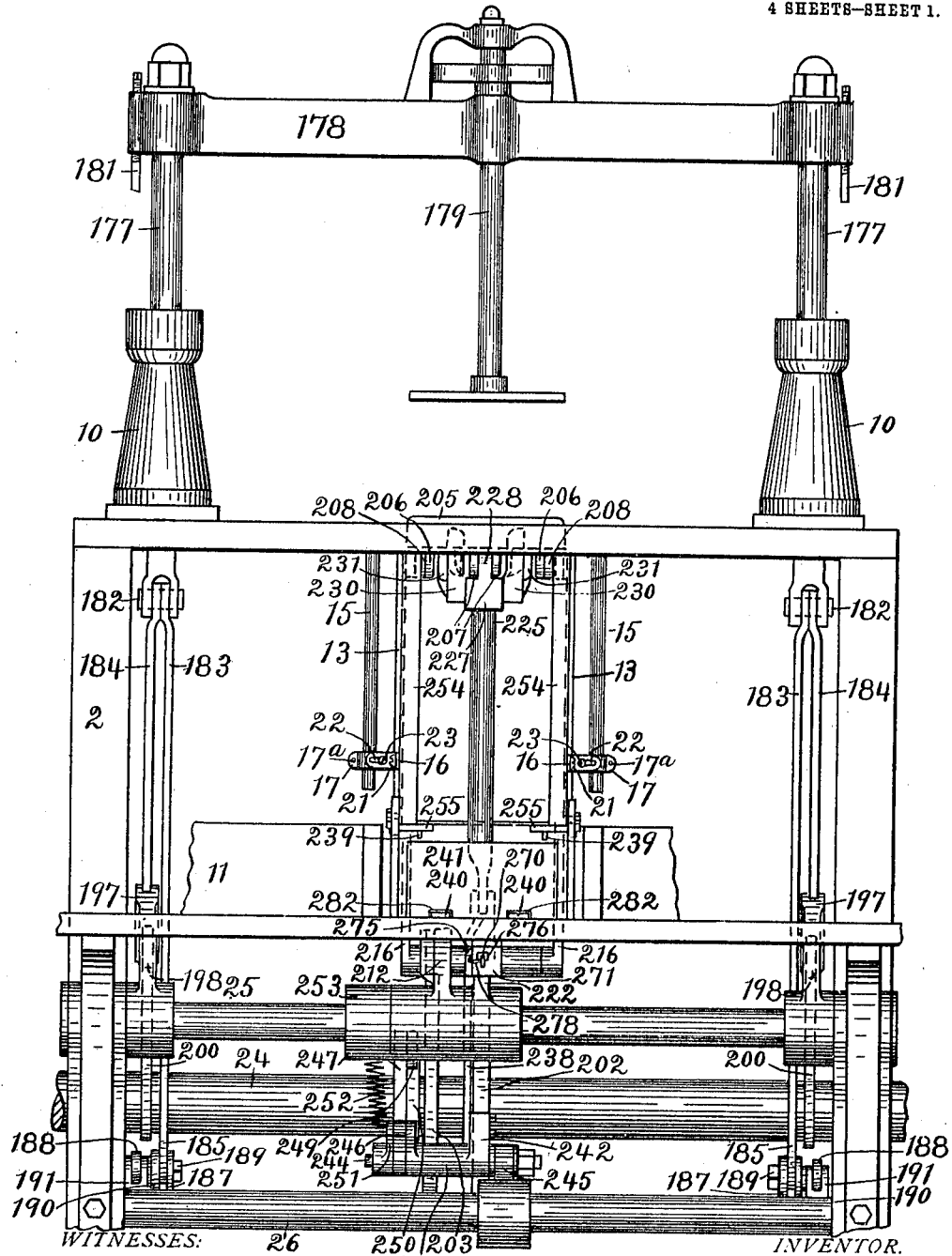

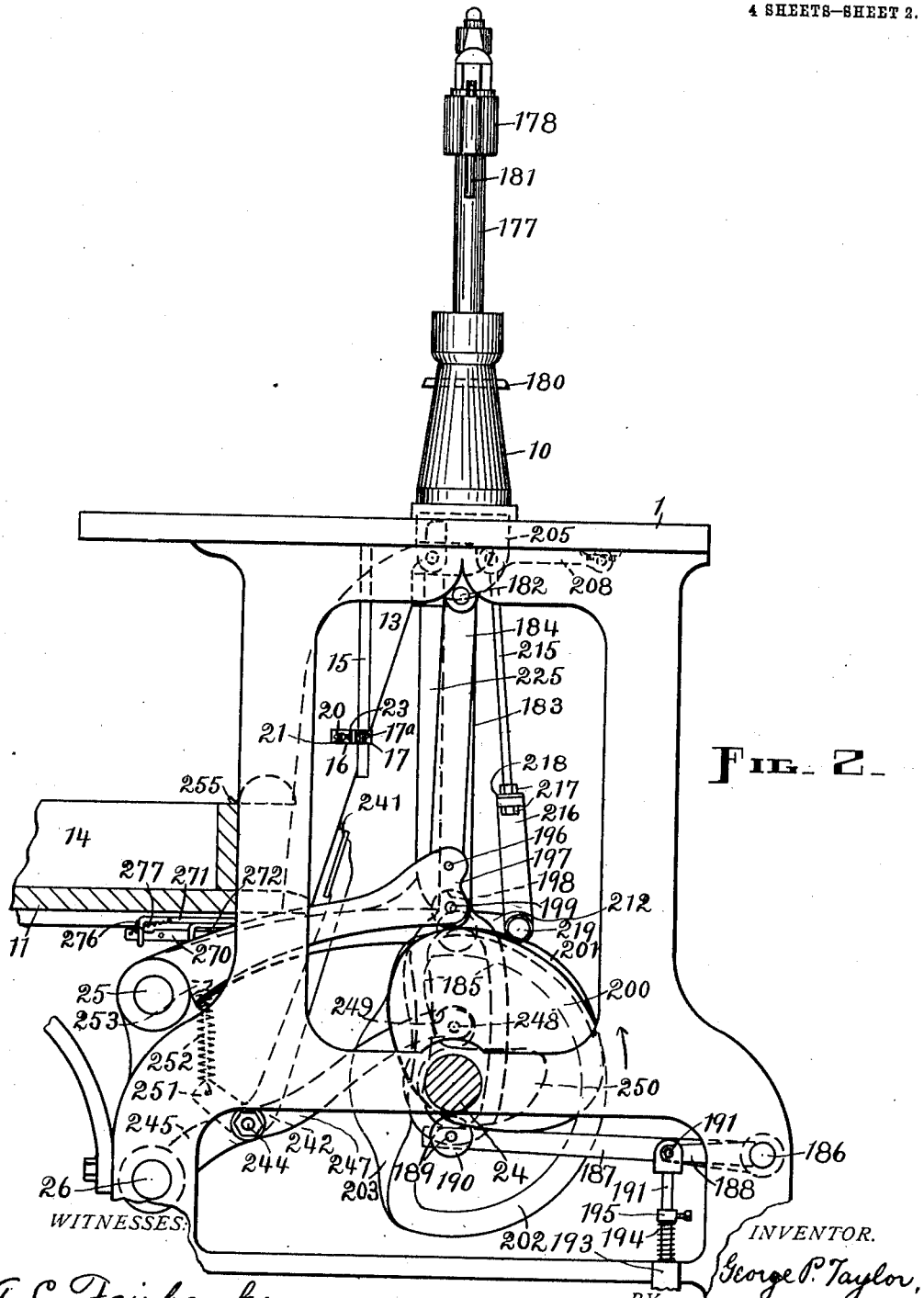

G. P. TAYLOR.
ENVELOP MACHINE.
APPLICATION FILED FEB. 9, 1910.
984,451.
Patented Feb. 14, 1911.
4 SHEETS—SHEET 3.
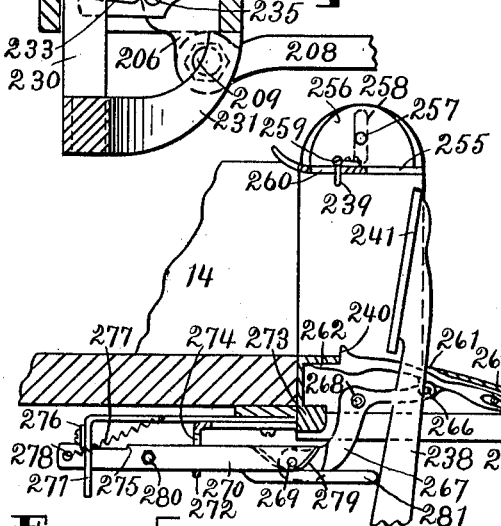
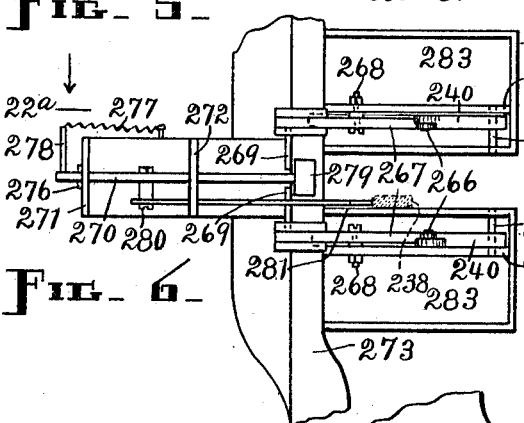
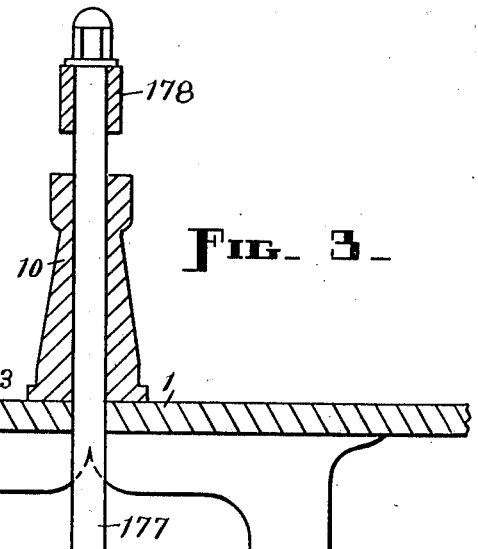
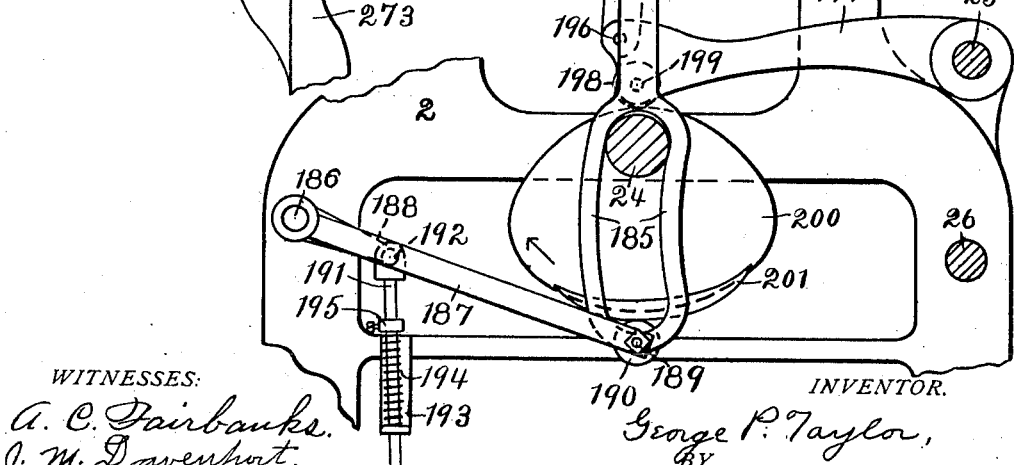
WITNESSES:
A. C. Fairbanks.
J. M. Davenport.
INVENTOR.
George P. Taylor,
BY
Webster & Co.,
ATTORNEYS.

G. P. TAYLOR.
ENVELOP MACHINE.
APPLICATION FILED FEB. 9, 1910.

984,451.

Patented Feb. 14, 1911.

4 SHEETS—SHEET 4.

WITNESSES:
A. C. Fairbanks.
J. M. Davenport.

INVENTOR.
George P. Taylor,
BY Webster & Co.,
ATTORNEYS.

UNITED STATES PATENT OFFICE.

GEORGE P. TAYLOR, OF HOLYOKE, MASSACHUSETTS.

ENVELOP-MACHINE.

984,451. Specification of Letters Patent. Patented Feb. 14, 1911.

Original application filed October 13, 1909, Serial No. 522,402. Divided and this application filed February 9, 1910. Serial No. 542,860.

*To all whom it may concern:*

Be it known that I, GEORGE P. TAYLOR, a citizen of the United States of America, residing at Holyoke, in the county of Hampden and State of Massachusetts, have invented certain new and useful Improvements in Envelop-Machines, of which the following is a specification, the same being a divisional part of an application filed by me in the United States Patent Office on the 13th day of October, 1909, Serial No. 522,402.

My invention relates to improvements in machines for making envelops, and more particularly to pressure-applying mechanism for the folded blanks or envelops, discharging mechanism for the envelops by means of which they are transferred from the folding-box to the chute, and delivery mechanism for the envelops by means of which they are moved forward from the chute into the receiving trough.

Briefly my invention resides in certain peculiar operating mechanism for a vertically-reciprocating plunger which presses the folded blanks or envelops to insure the sticking of the gummed flap to the end flaps and which is the folding-plunger, such mechanism including means for balancing said plunger to a considerable degree, or for providing a balanced motion therefor; a reciprocating and tilting folding-bed or trap, provided with knock-off fingers, for discharging the envelops into the chute; and improved mechanism for delivering the envelops to the receiving trough, such mechanism consisting in part of top and bottom disappearing back-stops which permit the envelops to be pushed into such trough by the presser-arm, all as hereinafter set forth.

The objects of my invention are, first, to regulate to better advantage in an envelop machine the amount of pressure on the folded blanks or envelops; second, to protect the folding-plunger mechanism from injury; third, to increase the certainty, safety, and facility with which the folded envelops are removed from the folding-box, this result being attained through the medium of mechanism which drops the trap some distance vertically while in a level position and before tilting it, so that said trap can carry each envelop clear of the walls of the folding-box, and consequently enables the folding-plunger to assist in the envelop-discharging operation by forcing from said box said envelop carried away and discharged by said trap, since a portion of the downward movement of said plunger is thus permitted to be utilized for this purpose—it may be noted, too, in passing, that the tilting action of said trap or its mechanism operates the knock-off fingers without any outside contact being required; fourth, to provide comparatively simple but entirely effectual means for taking care of the folded envelops at the delivery point of the machine, and, fifth, to produce an envelop machine which not only possesses all of the advantages herein pointed out, but is simple in its operation, makes less noise than other machines, and is strong, durable, easy to keep in repair and running order and condition, and withal practicable and efficient.

Other objects will appear in the course of the following description.

I attain the objects and secure the advantages herein pointed out by the mechanism illustrated in the accompanying drawings, in which—

Figure 1 is a front elevation of portions of an envelop machine in which is embodied a practical form of my invention; Fig. 2, a side elevation of the portions of the machine shown in the preceding view; Fig. 3, a detail showing the plunger-operating mechanism from the inside of the machine looking toward the right-hand side; Fig. 4, a section on lines 12—12, looking in the direction of the arrow, in Fig. 7; Fig. 5, an enlarged detail of the delivery mechanism, taken on lines 22ª—22ª, looking in the direction of the arrow, in Fig. 6; Fig. 6, a bottom view of said delivery mechanism; Fig. 7, an enlarged front elevation of the discharging mechanism, the middle portions of the connecting members being broken out, and, Fig. 8, an enlarged side elevation of said discharging mechanism, with portions broken out as in the view immediately preceding, said elevation being taken inside of the machine looking toward the left and showing the two extreme positions of said mechanism in which latter are included the trap and the knock-off fingers.

Similar figures refer to similar parts throughout the several views.

First considering the frame and other supporting parts of the machine, it will be observed that I provide a table 1 resting on two side pieces 2, two hollow posts 10 secured to the table 1 over the sides 2, an envelop-receiving table 11 suitably supported from the front of said sides below the table 1, and a chute 13 extending from said table 1 to said table 11, said chute having a forward inclination from top to bottom and being provided or connected at the base with a forwardly-projecting horizontal trough 14 which is let into said table 11 and the upper surface of the floor of which is level with the corresponding surface of such table. The sides 2 of the frame may be stiffened by means of cross-pieces to whatever extent is necessary, and provided with whatever supporting parts are required, but some of the parts and members have been omitted from the drawings in order to avoid obstructing essential elements which appertain more directly to the invention, and for this reason as well as for lack of space, too, portions of the frame, the table 11, and other elements have been broken off or broken away.

The chute 13 comprises two side pieces that are adjustably supported from two rods 15, depending from the table 1, by means of slotted angle-irons 16—16 secured to said sides on the outside, and clips 17—17 clamped on to said rods. Slots 20 in the angle-irons 16, through which screws 21 pass to fasten said angle-irons to the side pieces of the chute 13, enable the latter to be adjusted forward or backward, and slots 22 in said angle-irons, through which screws 23 pass to fasten the angle-irons to the clips 17, enable said side pieces to be adjusted laterally. Vertical adjustment can also be effected by loosening the clips 17 and moving them up or down on the rods 15. Screws which clamp the clips 17 to the rods 15 are represented at 17$^a$. The chute opens at the top into the folding-box as usual, and at the bottom into the trough 14.

Journaled in the sides 2, below the horizontal plane of the table 11, and in the center of the machine, is a main-driving and cam shaft 24. Parallel with each other and with the shaft 24 are two shafts 25 and 26 which are mounted in the sides 2 forward of said shaft 24. The shaft 25 is above the horizontal plane of the shaft 24, and the shaft 26 below such plane. The main shaft 24, in practice, may be equipped with the usual driving-pulley, clutch, and balance or hand-wheel, although the precise manner of and means for actuating said shaft is not material to the present invention.

The folding mechanism for the envelops, or rather for the blanks out of which the envelops are made, with the exception of two members presently to be described, is omitted, since it forms no part of my invention, is old and well-known, and is not needed for a full and clear understanding of said invention. The last-mentioned omitted parts are the folders themselves and the mechanism which operates them, the location of the former being in the center of the table 1 between the posts 10.

The parts of the machine thus far described are generally very similar to corresponding parts in other types or styles of envelop machines, excepting in so far as such parts are more or less directly influenced by the new features or combine more or less intimately with them. Having, now, very fully explained the aforesaid parts, I will next take up in detail the description of the several new features in both their structure and function, commencing with the folding-plunger-operating mechanism.

Having special reference to the first three views, it will be observed that two vertically-reciprocating rods 177 are arranged in the hollow posts 10, and that a cross-head 178 for a folding-plunger 179 connects said rods at the top. The folding-plunger 179 is a vertical member supported in the center of the cross-head 178, depending some distance below the same, and having a folding-plate 180 at the base. This plunger is also for compression purposes, and it is its use in this capacity with which I have to do more particularly in the present invention. Vertical bolts forming stop pins 181—181 are tapped into the ends of the cross-head 178, over the tops of the posts 10, to limit the downward movement of said cross-head when they encounter said posts, the amount of such movement being changed by adjusting said pins in said cross-head.

The rods 177 are reciprocated by the following means and in the following manner: Connected at their upper ends by a pin 182 to the base of each of the rods 177 are two rods 183 and 184, the rod 183 being the inner one. Each rod 183 has a link 185 at the bottom, which link is merely for the purpose of providing means for said rod to clear the shaft 24 without weakening the rod. A stud 186 projects inward from each side piece 2, and loose on such stud is a double rocker-arm member comprising a long arm 187 and a short arm 188. The arms 187 and 188 extend forward, and each of the former is pivotally connected at 189 with the base of the adjacent link 185, a roll 190 being interposed on the pivot immediately contiguous to the outside face of said link. The rocker-arms 187 and 188 are tensioned upwardly by means of two rods 191 having their upper ends pivoted at 192 to the front ends of the short arms 188 and their lower terminals loose in the inwardly-turned portions of two brackets 193 on the inside of the side-pieces 2, through which inturned portions said rods are adapted to reciprocate freely, and springs 194 encircling said rods between said inturned portions of the brackets and collars 195 on the rods, such collars being adjustable and so providing for changing the tension of said springs. The eyes in the links 185, through which the shaft 24 extends, are curved so as to enable the rods 183 to be swung on the pivots 182 by the action of the rocker-arms 187 as they oscillate on the studs 186. The base of each rod 184 is pivoted at 196 to the rear end of a cam arm 197 loose on the shaft 25. A roller 198 is mounted on a stud or pin 199 carried by each arm 197 below the pivot 196. A cam 200 is fast on the main-shaft 24 under the roll 198. The "high" part of each cam 200 is widened by a shoe 201 securely attached to said cam on the inside, such shoe normally being over the link roll 190.

The cams 200 when in motion, assisted by gravity, cause the folding-plunger 179 to be reciprocated through the medium of the arms 197, rods 184 and 177, and the crosshead 178, and to be brought down positively at the end of its downward travel each time through the medium of the shoes 201, the rolls 190 and the rods 183. That this last may be fully comprehended, it should be observed that the weight of the folding-plunger members is supported by the rolls 198 on the cams 200 excepting just before said plunger reaches the end of its downward stroke when there is or may be, assuming the machine to be engaged in the work of folding envelops, a tendency to stop short of such end of the stroke, and it is at this time that the shoes 201 act to finish positively said stroke and insure the sticking of the flaps of the folded envelop beneath the folding-plate 180. The shoes 201 operate while the rolls 198 are on or above the "low" parts of the cams 200. The rocker-arms 187, upwardly spring-pressed as they are, serve to steady the movement of the cam-operated and more especially the shoe-operated parts, and as balancing mediums for the reciprocating members.

In the event that some obstacle gets into the folding-box or some obstruction otherwise interferes with the downward movement of the plunger 179, the rolls 190 are not carried low enough to be ridden down by the shoes 201, but the latter pass under said rolls, instead of over them, either in or out of contact therewith according to their location, wherefore said plunger is not forced to complete its down stroke or further depressed and all liability is obviated of breakage or other injury to the machine from such obstacle or obstruction. After getting rid of the interfering medium the folding-plunger-operating mechanism resumes its former action.

Figure 8:
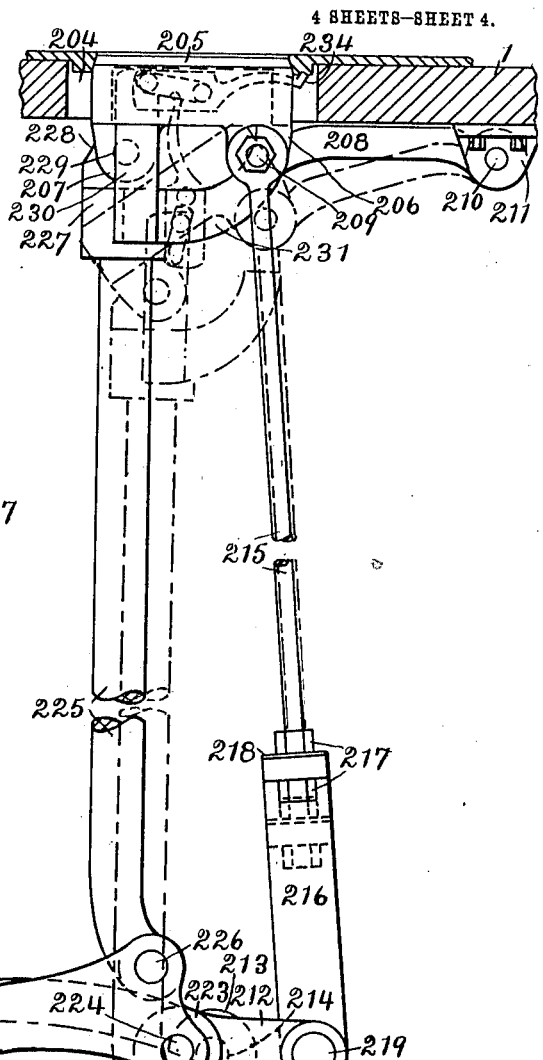

Taking up next the discharging mechanism, which depends for its operation on two cams 202 and 203 fast to the main shaft 24 in the center, as illustrated to the best advantage in Figs. 4, 7 and 8, attention is again called to the fact that this mechanism has to do with the bottom of the folding-box which coöperates in a way with the folding-plate 180. In the table 1 below the folding-plate 180 is an opening 204, and arranged to operate in this opening is a folding-bed or trap 205 which is the aforesaid folding-box bottom. The trap 205 is provided at the rear with two pairs of depending lugs 206 and at the front with a pair of depending lugs 207. Two links 208 connect the trap 205 with the table 1, the front end of each of said links being pivoted at 209 between the lugs 206 in each pair, and the rear end of such link being pivoted at 210 to a bracket 211 on the underside of the table. A cam arm 212 is mounted loose at its front end on the shaft 25, and is provided with a roll 213 which rides on the cam 203, such roll being mounted on a stud or pin 214 set in said arm a short distance from the rear end thereof. As a means for connecting the rear end of the arm 212 with the trap 205, I employ in this case two side rods 215 which depend from the pivots 209, two side bars 216 to the outturned tops of which the lower terminals of said rods are fastened by nuts 217 threaded to said lower terminals one above and one below each of such outturned tops or ears, a stiffening plate or cross-piece 218 connecting said rods between said ears and the upper nuts, and a pivot pin 219 which connects the lower ends of said bars with each other and with said rear end of said arm, sleeves 220 and 221 being used on said pin between said bars and said arm to separate them and add rigidity to the structure.

Loosely mounted at its front end on the shaft 25, at the right of the cam arm 212, is a cam arm 222 which has a roll 223 mounted on a stud or pin 224 at the rear end to ride on the cam 202. A connecting-rod 225 has its base pivoted at 226 to the rear end of the arm 222 above the stud 224, and is provided at its upper end with a head 227. A lug 228 rises from the center of the head 227 between the lugs 207 to be pivoted thereto at 229, two uprights 230 rise straight up from the sides of said head into the interior of the trap 205, and a corresponding number of curved rests 231 extend rearwardly and upwardy from the head to support the back part of said trap when and while the trap is in its horizontal position, the trap then receiving and bearing on said rests at points just inside of the inner lugs 206.

The trap 205 is provided with two knock-off fingers 232, each having a slot 233 in its body portion and a hook 234 at its rear end to engage the back edge of an envelop on said trap, and being pivoted intermediate of its ends at 235 against the inside face of one of the inner lugs 206 a little below the top of said trap. A pin 236 extends outward from each upright 230 near the top into the slot 233 in the adjacent finger 232. A slot 237 is cut in the top of the trap 205 for each finger 232, such slot being so positioned as to enable the hooked portion of said finger to operate in and out of the same from below or to strike upward and forward through said slot and then recede below said trap top.

Owing to the construction and weight of the parts which bear on the cams 202 and 203, gravity alone may be depended on to keep the rolls 223 and 213, respectively, on said cams at all times.

The shape of the cams 202 and 203 is such that during more than half of each revolution they maintain the trap mechanism in the positions shown in full and dotted lines in Figs. 4, 7 and 8, with the trap 205 at its highest point approximately on a level with the top of the table 1, then as said cams continue their rotation and lower portions of their peripheries pass beneath the rolls 223 and 213 the arms 222 and 212 and the connecting-rod 225 and connections between said arm 212 and the lugs 206 drop together an equal distance and depress said trap without tilting it, the trap being drawn toward the rear a little way, however, by the links 208 which swing down, and finally upon further rotation of the cams and as the low part of the cam 202 passes beneath the roll 223 and the adjacent higher part of the cam 203 passes beneath the roll 213 the front of the trap is depressed sharply and the knock-off fingers 232 are suddenly thrown up through the slots 237 into an approximately vertical position, all as indicated by dot-and-dash lines in Fig. 8. These operations first take an envelop on the trap entirely out of the way of the folding mechanism and everything above said trap, and then unfailingly discharge said envelop into the chute 13. In tilting, the trap fulcrums on the links 208, also on the connection between the trap and the arm 212, and the relative positions of the pins 236 and pivots 235 change so that the former occupy positions in what were formerly the back ends instead of the front ends of the slots 233 and are under said pivots, resulting in the throwing up of the fingers 232. The rests 231 also pass away from the trap at this time, it not now being necessary that their function be exercised. Upon completing the revolution of the cams the movements just described are reversed and the trap and fingers restored to initial or normal positions, the cam 202 operating first to elevate the trap and withdraw the fingers into said trap, and both cams operating then to elevate the trap to the receiving place in the table 1.

The relation of the trap-operating mechanism to the folding-plunger-operating mechanism is such, that is, the parts are so timed, that the trap does not begin to descend until after the folding-plunger, under the impulse imparted to it by the shoes 201, has compressed and thoroughly sealed the envelop, and then said trap does not act to discharge the envelop into the chute until said folding-plunger has acted to force the envelop down out of the folding-box. This last result is made possible by the permitted gravity action of the folding-plunger and its carrying parts, limited by the stop pins 181. The shoes 201 maintain their influence over the folding-plunger long enough for the trap to begin its descent while under pressure from said plunger.

The last mechanism to be described is that which delivers the envelops, one at a time, from the chute 13 to the receiving trough 14. This mechanism comprises a sweep or presser-arm 238 which moves the envelop forward, and top and bottom back-stops 239 and 240, respectively, arranged in pairs. In this connection see Figs. 1, 2, 5 and 6. The presser-arm 238 has a plate 241 at the upper end which is designed to sweep an envelop forward into the trough 14 from the chute 13. The base of the presser-arm 238 is rigidly attached to a projection 242 at the right-hand end of a sleeve 243 loose on a horizontal stud 244. Said sleeve is secured at its right-hand end to a bracket 245 which is fastened firmly to the fixed shaft 26. Mounted on the stud 244 and rigidly attached to a projection 246 at the opposite end of the sleeve 243 is an upwardly-extending cam arm 247 provided at its free terminal with a stud or pin 248 upon which is mounted a roll 249. The roll 249 bears on a cam 250 tight on the main shaft 24. The arm 247 has a forward extension 251 and is tensioned toward the cam 250 by means of a spring 252 which connects said extension with a collar 253 fast on the fixed shaft 25 above. From this it is seen that as the cam 250 revolves the arm 247 is caused to oscillate and to rock the presser-arm 238 back and forth on the stud 244, through the medium of the sleeve 243.

The floor of the trough 14 is provided at the rear with two hollow extensions 283 spaced apart and having their upper surfaces curved downward slightly from front to back, as seen to best advantage in Fig. 5, and it is these curved surfaces that extend under the chute 13 to receive the envelops as they slide down said chute in front of the position which the plate 241 occupies when the presser-arm 238 is thrown way back. Two inner flanges 254 on the side pieces which comprise the chute 13, adjacent to the back edges of such side pieces, constitute the runway for the envelops, and the sides of the trough 14 at the back end are provided with inner flanges 255 which are generally horizontal, and the plate 241 oscillates between a position behind the front faces of said flanges 254, passing under them, and a position in advance of the back-stops 239 and 240, and between the extensions 283 and said flanges 255, inwardly to carry an envelop in front of said plate from the chute into said trough, and rearwardly to take position for another envelop. The usual weighted block (not shown) is employed in the trough 14 against which the envelops are pressed as they are fed forward into said trough, and it is for the purpose of supporting the envelops behind, when the plate 241 moves rearwardly, that the back stops 239 and 240 are provided. The presser-arm 238 plays back and forth in the space between the extensions 283.

The flanges 255 overcome any tendency which an envelop might have to "ride up" while being deposited in the trough 14 by the presser-arm plate 241, and each has an ear 256 which is fastened against the inside face of one of the walls of said trough by a screw 257 that passes through a slot 258 in such wall into threaded engagement with said ear, the usual washer being interposed between the wall and the head of said screw. By this means the flanges 255 can be adjusted to give the proper amount of clearance between them and the extensions 283 for the envelops. Each stop 239 is pivoted at 259 to one of the flanges 255 at the back end of a slot 260 therein, and is so arranged that it normally hangs down through such slot and bears against said back edge to support from behind and at the top envelops in the trough, but swings up into said slot when pressure is applied from the rear by the plate 241 to admit an envelop being swept forward thereby into said trough. The operation of these gravity stops will be clearly apprehended from an inspection of Fig. 5.

More substantial back-stops, automatically operated otherwise than by the direct contact therewith of an envelop borne forward by the plate 241 and gravity, are required to hold in place at the bottom the envelops in the trough 14, and such are found in the members 240 including the operating mechanism therefor. Referring more particularly to Figs. 5 and 6, it will be seen that each stop 240 is so arranged in one of the extensions 283 as to project normally through a slot 261 in such extension above the floor thereof; that such stop has a lip 262 at the front end to prevent it from rising too far out of said slot, and has a slot 263 in its rear end to receive a horizontal pin 264 fixed in the inner wall of the extension and a bar 265 in said extension parallel with and adjacent to said inner wall; and that said stop is pivoted intermediate of its ends, at 266, to the rear terminal of a bell-crank-lever 267. It will be seen, further, that the bell-crank-levers 267 are pivoted at 268—268 to the bars 265, and have pins 269—269 projecting from their front terminals toward each other, sufficient space being left between adjacent ends of said pins for an operating bar 270. This bar extends longitudinally beneath the trough 14 and is slidingly mounted in the vertical parts of two hangers 271 and 272 which extend forward, the former farther than the latter, and then downward, from a supporting part 273 of the machine frame. The bar 270 passes through a slot 274 in the hanger 272, which slot is long enough to allow said bar to move up and down therein. The upper edge of the bar 270 is cut away at 275, where said bar passes through the hanger 271, to receive a stop 276 fastened against the front end of said hanger. The stop 276 limits the longitudinal movement of the bar 270 and especially its rearward travel, and said bar is held normally with the front end of the cut-away portion 275 against said stop by means of a spring 277 which extends between a pin 278 at the front of the bar and a fixed point on the hanger 271. The back end of the aforesaid bar is in the form of a cam-head 279 which extends on both sides of the bar and inclines upwardly and rearwardly from the lower front edges. The arrangement and construction of these parts are such that the cam-head 279, when in normal position, is directly behind the pins 269 with their juxtaposed terminals immediately adjacent to the bottom edges of said head. Having its front end pivoted at 280 to the bar 270 is an actuating dog or arm 281 for said bar, which arm extends from its pivotal point backward through the hanger 272 into the path of travel of the presser-arm 238.

In practice, when the presser-arm 238 swings forward and before it arrives at the exposed or protruding parts of the back-stops 240 above the extensions 283 said arm encounters the dog or arm 281, and forces it forward with the attached bar 270, against the resiliency of the spring 277. As the bar 270 advances the cam-head 279 passes under the pins 269 and so raise them and rocks the bell-crank-levers 267, with the result that the latter actuate the stops 240 backward and at the same time downward on the pins 264 until they disappear entirely within the slots 261 or below the upper surface of the extensions 283. This disappearance takes place in ample time for the plate 241 to move over the positions which the stops 240 occupy when elevated. Immediately the cam-head 279 passes the pins 269 the front ends of the bell-crank-levers 267 drop, with said pins behind said cam-head, and the stops 240 are moved upward and forward by said bell-crank-levers into active position again, in readiness to support from behind the envelops in the trough 14 as soon as the plate 241 swings back. There are slots in the bottom edge of the plate 241 to accommodate the stops 240 so that said plate can return to initial position while the envelop which it has just advanced in front of said stops cannot return, but is then backed by these stops and the stops 239. The slots in the plate 241 for the stops 240 appear at 282—282, in Fig. 1. Upon the return of the presser-arm and the consequent release of the arm 281 and the bar 270 to the spring 277, said arm 281 and bar move back into their former or normal positions, the back side of the cam-head 279 contacting with the pins 269, and said head now riding up over said pins, instead of the latter riding up over the cam-head as was done in the first place, the slot 274 in the hanger 272 permitting the necessary amount of vertical movement or upward inclination on the part of said bar and the connection between the bar and the hanger 271 and stop 276 being sufficiently loose for the purpose. The parts of the bell-crank-levers that carry the pins 269 cannot go any lower, after the lips 262 of the stops 240 strike the extensions 283 adjacent to the slots 261, so necessarily the cam-head rides over said pins, as explained, and takes position behind them in readiness to engage said pins and operate the associated parts when next the presser-arm is actuated forward.

The complete operation of so much of the machine as is herein shown and described, as a whole, will be pretty generally understood from the foregoing description of the several members and mechanisms, but following are a recapitulation and brief description of such operation, it being assumed that the machine has been set in motion, and that a gummed blank has been delivered beneath the folding-plunger 179 and over the folding-box. The folding-plunger now descends and with its plate 180 forces the blank on to the trap 205. Here the now upstanding flaps are turned down or folded in by the folding mechanism hereinbefore alluded to, with the gummed flap over the two end flaps. Meanwhile the folding-plunger rises. At about the same time that the folding-plunger begins to rise, or possibly a little before, the operation of the trap 205 occurs. At the time of such occurrence the first blank is held by its upstanding flaps in the folding-box, and said trap is up in place again to support said blank by the time said plunger is out of the way and the folders commence to operate, the formation and arrangement of the cams 200, 202 and 203 being such as to insure the aforesaid results. Next a second blank is fed beneath the plunger, and the plunger forces it down onto the trap on top of the folded envelop already there, the shoes 201 causing said envelops to be compressed between said trap and the plate 180 and the gummed flap to be firmly and thoroughly stuck to the end flaps. Now the trap descends and tilts and the knock-off fingers 232 are thrown up the second time with the result that the envelop is discharged into the chute 13, arriving at the bottom of said chute in front of the presser-arm plate 241. During the first cycle of the machine the presser-arm 238 had no work to do, but during the second cycle of the machine and every subsequent cycle said arm moves an envelop forward into the trough 14, actuating the back stops 239 and 240 out of the way, and swings back, leaving said stops to support the envelop or envelops in said trough from behind. The delivery of the first envelop to the trough is the final act which the machine performs during the making of the first and every subsequent envelop. The cam 250 brings about the proper operation of the presser-arm.

The above-described operations are repeated for each envelop and the compressing, discharging and delivering continue as long as the machine is in motion and the supply of blanks is maintained.

It is pertinent to observe, in connection with the action of the machine, that the envelops are delivered by the machine at every cycle excepting the first and last envelops of the run; for each of these latter the machine must perform two cycles or at least a cycle and a half, because two down strokes of the folding-plunger are required for each envelop, the first to depress the blank ready for folding, and the second to compress the blank after being folded. But inasmuch as said plunger operates on a folded blank and an unfolded blank at once, after the first and until the last, there is an envelop ready to be discharged and delivered at every cycle excepting the first one. At the first cycle of the run the folding-plunger acts on one blank, and at the last cycle of such run the same thing is true, the last blank being a folded blank, however, while the first was in sheet form which had its flaps turned up by said plunger at the initial down stroke of the latter. The action of the machine is very rapid and the envelops are turned out speedily and without loss of time.

The table 11 is for the convenience of the operator when the trough 14 becomes full.

The envelops when they leave this machine are complete with the exception of the gumming of their sealing flaps.

Although the machine herein shown and described is practical and efficient in every particular, it is obvious to one skilled in the art that various changes and modifications may be made therein without departing from the nature of my invention, hence I do not wish or intend to be restricted or confined exactly or too closely to the aforesaid construction.

What I claim as my invention, and desire to secure by Letters Patent, is—

1. The combination, in an envelop machine, with a folding-plunger rod mounted for vertical motion in the machine, cam-engaging means comprising two members pivotally connected with said rod, and suitable positioning means for such members to guide and limit their pivotal movement, of a suitably mounted cam adapted to elevate said rod, through the medium of one of said members, and provided with a shoe on one side of its high part, such shoe being adapted either to depress positively said rod at the end of the down stroke of the latter, through the medium of the other of said members, or to act without thus depressing said rod, according to the lowness of the descent of said rod.

2. The combination, in an envelop machine, with a rotary shaft having a pair of cams tight thereon, each of said cams being provided with a shoe on one side of its high part, a fixed shaft, and a pair of cam arms mounted on said fixed shaft and arranged to bear on the cams, of a pair of folding-plunger rods mounted for vertical motion in the machine, rods connecting said cam arms with said folding-plunger rods, and rods connected at their upper ends with said folding-plunger rods and provided with members carried in the paths of the shoes on said cams.

3. The combination, in an envelop machine, with a rotary shaft having a pair of cams tight thereon, each of said cams being provided with a shoe on one side of its high part, a fixed shaft, and a pair of cam arms mounted on said fixed shaft and arranged to bear on the cams, of a pair of folding-plunger rods mounted for vertical motion in the machine, rods connecting said cam arms with said folding-plunger rods, rods connected at their upper ends with said folding-plunger rods and provided with members carried in the paths of the shoes on said cams, and pivotally-mounted upwardly spring-pressed arms pivotally connected with said last-mentioned connecting-rods.

4. In an envelop machine, the combination, with a table, of envelop-discharge mechanism comprising a trap, pivotal connections between said table and one end of said trap, a shaft, two cams on such shaft, connections between the other end of said trap and one of said cams, and connections between said trap at the end where said first-mentioned connections are attached and the other of said cams, the construction and arrangement of parts being such that said trap is depressed and inclined out of the horizontal at the lower end of its travel only.

5. In an envelop machine, the combination, with a table, of envelop-discharge mechanism comprising a trap, pivotal connections between said table and one end of said trap, a shaft, two cams on such shaft, connections between the other end of said trap and one of said cams, and connections between said trap at the end where said first-mentioned connections are attached and the other of said cams, the construction and arrangement of parts being such that said cams maintain said trap normally in a horizontal position, but permit it to descend first without tilting and then cause it to tilt as it continues to descend.

6. In an envelop machine, the combination, with a table, of envelop-discharge mechanism comprising a trap, pivotal connections between said table and one end of said trap, a shaft, two cams mounted on such shaft, connections between the other end of said trap and one of said cams, a knock-off finger operatively connected with said trap and said last-mentioned connections, and connections between said trap at the end where said first mentioned connections are attached and the other of said cams, the construction and arrangement of parts being such that said finger is operated only after said trap has made a partial descent.

7. In an envelop machine, the combination, with a table, of envelop-discharge mechanism comprising a trap, pivotal connections between said table and one end of said trap, a shaft, two cams on such shaft, connections between the other end of said trap and one of said cams, a knock-off finger operatively connected with said trap and said last-mentioned connections, and connections between said trap at the end where said first-mentioned connections are attached and the other of said cams, the construction and arrangement of parts being such that two motions are imparted while descending to said trap by said cams, and said finger is actuated while one only of such motions is taking place.

8. In an envelop machine, the combination, with a table, of envelop-discharge mechanism comprising a trap, pivotal connections between said table and one end of said trap, a shaft, two cams on such shaft, connections between the other end of said trap and one of said cams, a knock-off finger operatively connected with said trap and said last-mentioned connections, and connections between said trap at the end where said first-mentioned connections are attached and the other of said cams, the construction and arrangement of parts being such that said trap, when permitted to descend by said cams, is inclined out of the horizontal and said finger is operated at the lower end only of the travel of said trap.

9. In an envelop machine, the combination, with a table, of envelop-discharge mechanism comprising a trap provided with a knock-off finger, pivotal connections between said table and one end of said trap, a shaft, two cams on such shaft, connections between the other end of said trap and said finger and one of said cams, and connections between said trap at the end where said first-mentioned connections are attached and the other of said cams, said cams being adapted to maintain said trap normally in a horizontal position with said finger inactive, and to permit said trap to descend for a distance while in such position, with said finger still inactive, and then to descend farther and at the same time tilt and said finger to be actuated.

10. The combination, in an envelop machine, with a table having an opening therethrough, of a folding-bed or trap adapted to operate in and out of such opening from below, link connections between said trap and table, cam-operated connections pivotally attached to said trap, a head pivotally attached to said trap in front of said first-mentioned pivotal attachment provided with rests arranged to support said trap at the rear when said trap is in a horizontal position, and cam-operated connections attached to said head.

11. The combination, in an envelop machine, with a table having an opening therethrough, of a folding-bed or trap adapted to operate in and out of such opening from below, link connections between such trap and table, cam-operated connections pivotally attached to said trap, a head pivotally attached to said trap in front of said first-mentioned pivotal attachment and provided with projecting members, cam-operated connections attached to said head, and knock-off fingers operatively connected with said trap and projecting members.

12. The combination, in an envelop machine, with a table having an opening therethrough, a folding-bed or trap arranged to operate in and out of such opening from below, links pivotally connecting such trap with such table, two suitably mounted cam-arms, and connecting means between such arms and the trap, the connections between the trap and one of the arms being in advance of those between the trap and the other of such arms, of suitably-mounted operating cams for said arms, such cams being adapted to lower the trap for a distance while said trap is in a horizontal position and then to tilt it.

13. The combination, in an envelop machine, with a table having an opening therethrough, a slotted folding-bed or trap arranged to operate in and out of such opening from below, links pivotally connecting such trap with such table, two suitably-mounted cam-arms, connecting means between such arms and the trap, the connections between the trap and one of the arms being in advance of those between the trap and the other of such arms, and knock-off fingers pivotally attached within the trap in operative relation to the slotted portions thereof and operatively connected with the aforesaid advanced connections between trap and cam-arm, the arrangement of parts being such that said fingers are thrust through the slots in the trap when the latter is tilted, of suitably-mounted cams for said arms, such cams beng adapted to lower the trap for a distance while said trap is in a horizontal position and then to tilt it.

14. The combination, in an envelop machine, with a table, a folding-plunger, and a chute, of a trap interposed between said plunger and chute, pivotal connections between said table and one end of said trap, a shaft, two cams on such shaft, and connections between said trap and said first-mentioned connections on the one hand and the opposite end of said trap on the other hand and said cams, whereby said trap when depressed is first maintained in a horizontal position in its descent and then tilted.

15. The combination, in an envelop machine, with a table, a folding-plunger, and a chute, of a trap interposed between said plunger and chute and provided with a knock-off finger, pivotal connections between said table and one end of said trap, a shaft, two cams on such shaft, connections between the opposite end of said trap and said finger and one of said cams, and connections between said trap at the end where said first-mentioned connections are attached and the other of said cams, whereby said trap when depressed is first maintained in a horizontal position in its descent and then tilted and said finger caused to be operated.

16. The combination, in an envelop machine, with a table, a folding-plunger, positive means to depress said plunger, and a chute, of a trap interposed between said plunger and chute, pivotal connections between said table and one end of said trap, a shaft, two cams on such shaft, and connections between said trap and said first-mentioned connections and the opposite end of said trap and said cams, whereby said trap is depressed, after the operation of such positive means, and when depressed is first maintained in a horizontal position and then tilted.

17. The combination, in an envelop machine, with a table, a trap, pivotal connections between said table and trap, a shaft, two cams on such shaft, and connections between said trap at the front and back thereof and said cams, whereby said trap when depressed is first maintained in a horizontal position and then tilted, of a folding-plunger arranged to follow said trap in its initial descent.

18. The combination, in an envelop machine, with a table, a trap, pivotal connections between said table and trap, a shaft, two cams on such shaft, connections between said trap at the front and back thereof and said cams, whereby said trap when depressed is first maintained in a horizontal position and then tilted, of a folding-plunger, and plunger-operating mechanism capable of positively forcing said plunger onto said trap, before the latter descends, and then permitting said plunger to descend by gravity.

19. In an envelop machine, envelop-delivery mechanism comprising an oscillating presser-arm, a back stop for the envelops at the bottom, and independent of but having a part in the path of said arm and operated and controlled by said arm to depress said stop before an envelop swept forward by said arm arrives at said stop, and to elevate the latter when said arm reaches the end of its forward stroke.

20. The combination, in an envelop machine, with a chute, a receiving trough, and an oscillating presser-arm adapted to deliver envelops from said chute to said trough, of a back-stop mounted below the floor of the trough and arranged to project normally above such floor, and operating mechanism adapted to depress said stop ahead of an advancing envelop and to release said stop and permit it to rise behind such envelop, such mechanism being independent of but having a part which extends into the path of said arm.

21. The combination, in an envelop machine, with a chute, a receiving trough, and an oscillating presser-arm adapted to deliver envelops from said chute to said trough, of reciprocating and oscillating back-stops mounted below the floor of the trough and arranged to project normally above such floor, bell-crank-levers pivotally connected with said stops and provided with pins at their free terminals, and a loosely-mounted backwardly-spring-pressed bar having a cam-head and provided with a member which extends into the path of said presser-arm, said cam-head being positioned normally behind said pins and capable of acting through them, when said bar is forced forward against the resiliency of its spring by the arm, on said bell-crank-levers to remove the stops from the path of an advancing envelop, and then, when the bar is released by the arm to the spring, of riding over the pins and again dropping into place behind them.

22. The combination, in an envelop machine, with a chute, a receiving trough, and an oscillating presser-arm provided with a plate adapted to deliver envelops from said chute to said trough, said plate having slots in the bottom, of reciprocating and oscillating back-stops mounted below the floor of the trough and arranged to project normally above such floor, each of such stops being in line with one of the slots in said plate, bell-crank-levers pivotally connected with said stops and provided with pins at their free terminals, and a loosely-mounted backwardly-spring-pressed bar having a cam-head and provided with a member which extends into the path of said presser-arm, said cam-head being positioned normally behind said pins and capable of acting through them, when said bar is forced forward against the resiliency of its spring by the arm, on said bell-crank-levers to remove the stops from the path of an advancing envelop, and then, when the bar is released by the arm to the spring, of riding over the pins and again dropping into place behind them.

23. The combination, in an envelop machine, with a chute, a receiving trough, and an oscillating presser-arm adapted to deliver envelops from said chute to said trough, of reciprocating and oscillating back-stops mounted below the floor of the trough and arranged to project normally above such floor, bell-crank-levers pivotally connected with said stops and provided with pins at their free terminals, a loosely-mounted backwardly-spring-pressed bar having a cam-head and provided with a member which extends into the path of said presser-arm, and means to limit the backward movement of such bar, said cam-head being positioned normally behind said pins and capable of acting through them, when said bar is forced forward against the resiliency of its spring by the arm, on said bell-crank-levers to remove the stops from the path of the advancing envelop, and then, when the bar is released by the arm to the spring, of riding over the pins and again dropping into place behind them.

24. The combination, in an envelop machine, with the frame of the machine, and supporting rods depending therefrom for a chute, of a chute, and means to attach said chute to said rods and to adjust it up or down, forward or backward, and laterally.

GEORGE P. TAYLOR.

Witnesses:
F. A. CUTTER,
A. C. FAIRBANKS.